Jan. 24, 1939. L. ANTONELLI 2,144,955
LATHE
Filed Sept. 27, 1937
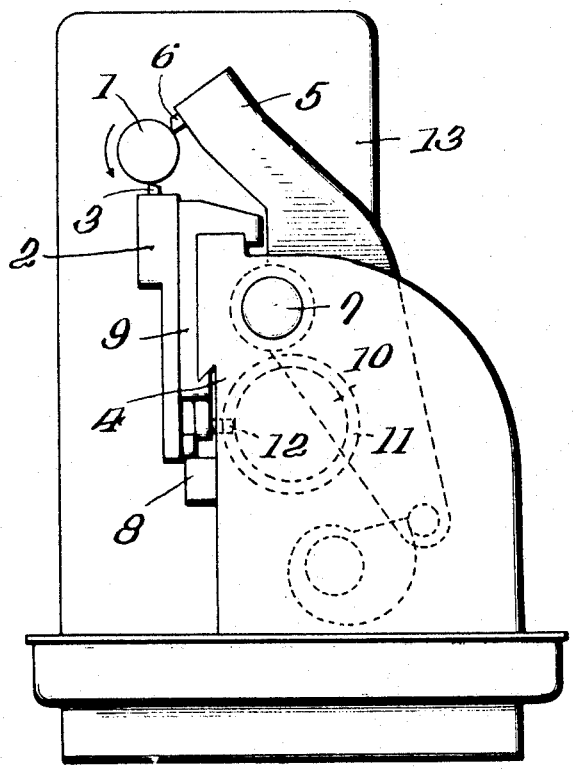
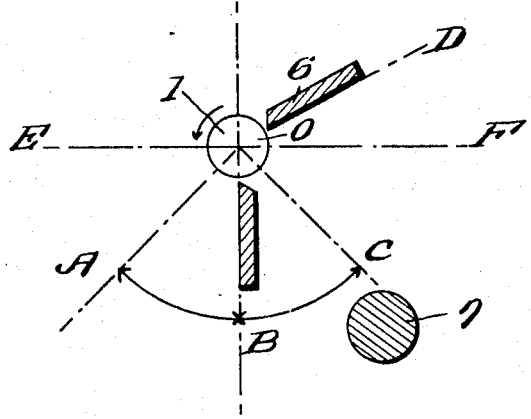
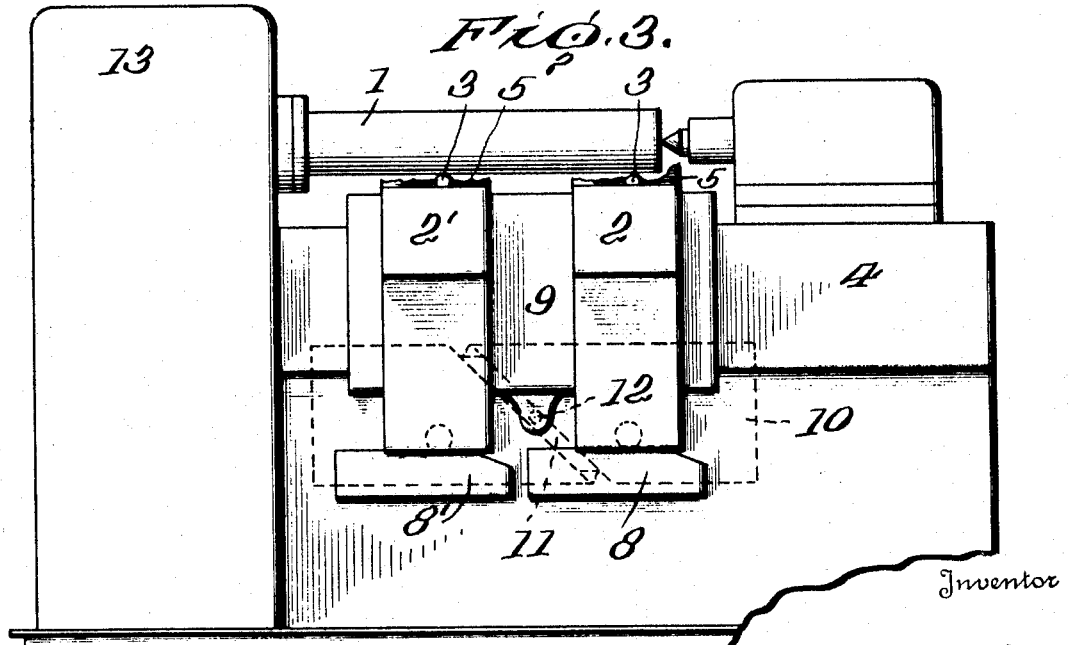
Inventor
L. Antonelli
By C. F. Wenderoth
Attorney Patented Jan. 24, 1939

2,144,955

UNITED STATES PATENT OFFICE 2,144,955

LATHE

Leonida Antonelli, Padova, Italy, assignor to Ufficio Tecnico Industriale Tessili Artificiali, Rome, Italy Application September 27, 1937, Serial No. 166,000
In Italy September 30, 1936

2 Claims. (Cl. 82—25)

This invention relates to certain new and useful improvements in the disposition of carriages and tools on lathes for the machining of metal works.

An object of this invention is to provide such a novel disposition allowing the easy delivery of cuttings produced by the tools.

With the above object in view, according to this invention the tool or tools carried by a main carriage operate on the lower quadrants of the work, within an angle enclosed by two lines starting from the axis of the mandrel an making each 45° with a vertical line passing through the said axis.

A lathe constructed according to the above features is very compact in its structure and provides for the conditions necessary for utilization of the whole capacity of the metal-carbid tools or of other modern tools by which at the high operating speeds allowed for, severe stretchings are placed on the lathes and a great amount of cuttings is produced.

In the accompanying drawing a lathe embodying this invention is somewhat diagrammatically illustrated. Figure 1 is a side view, looking at the lathe from the head stock towards the chuck; Figure 2 shows the relation of the carriage tool or tools to the horizontal line EF passing through the axis of the mandrel or chuck. Fig. 3 is a front view of the lathe shown in Figure 1.

Referring to Figs. 1 and 2 of the drawing, the rotating work 1 is to be machined by a tool 3 carried by a carriage 2 sliding on the bed 4. The tool 3 is placed in such a position as to operate on the lower quadrants of the work 1 below the horizontal line EF on the parts within the angles AOB—BOC enclosing each 45° with the vertical line BO.

When the lathes comprise a swinging arm 5 carrying one or more tools 6, the spindle 7 of the swinging arm which can further receive a translation movement, can be within an angle of 45° from the axis O of the mandrel and from the vertical line OB.

By improvements according to this invention there is avoided the drawback of faulty delivery of the great amounts of cuttings carried away by hard tools on modern lathes with horizontal flat or prismatic beds and high operating speeds, so that stopping in the machining of the works are no more liable to occur. Moreover, by this invention, the reactions to the penetration work of the tools are carried by the below placed bed, so that a very good steadiness is secured.

What I claim is:

1. A lathe in which the tool operates upon the lower sector of the work comprising a work spindle, a tool holder designed to hold a tool with its cutting edge directed towards the operator, a bed and a guiding track for said tool holder on said bed located on the side opposite the operator of a plane passing through the axis of the work and the cutting edge of the tool.

2. A lathe comprising a main carriage, a work spindle, means for holding a plurality of tools to operate on the lower quarter of the work in the sector formed by angles of 45° before and behind a vertical plane passing through the axis of the work, tool holders for holding the cutting edges of the tools facing the operator, tool carriages bearing on the main carriage having its chief sliding plane, referring to the aforesaid vertical plane, on the opposite side than the operator and essentially parallel to the plane passing through the center of the work and the cutting edge of the tools, and means for moving the carriages of the single tools independently towards the work.

LEONIDA ANTONELLI.